(12) United States Patent
Sackmann et al.

(10) Patent No.: US 6,310,132 B1
(45) Date of Patent: Oct. 30, 2001

(54) SIZING AGENTS FOR PAPER

(75) Inventors: Günter Sackmann, Leverkusen; Eckhard Wenz, Köln; Joachim König, Odenthal; Bernhard Jansen, Köln; Thomas Roick, Leverkusen; Bernd Thiele, Odenthal; Johan Kijlstra, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/211,383

(22) Filed: Dec. 15, 1998

(30) Foreign Application Priority Data

Dec. 18, 1997 (DE) ................................ 197 56 372

(51) Int. Cl.$^7$ ................................ C08F 2/20; C08F 2/24; C08F 220/00; C08L 35/00; C08L 75/04
(52) U.S. Cl. ................................ 524/457; 524/458; 524/504; 524/734; 524/742; 524/745; 524/804; 162/164.5
(58) Field of Search ................................ 516/9; 524/734, 524/745, 742, 53, 504, 458, 457, 800, 804, 819, 820, 823, 824, 827, 831, 833; 162/164.5

(56) References Cited

U.S. PATENT DOCUMENTS

| | | | |
|---|---|---|---|
| 2,840,589 | 6/1958 | Smeltz | 560/334 |
| 2,941,966 | 6/1960 | Campbell | 521/155 |
| 3,632,535 | * 1/1972 | Gramera et al. | 524/734 |
| 4,077,989 | 3/1978 | Schäfer et al. | 554/56 |
| 4,171,407 | * 10/1979 | Eleser et al. | 524/734 |
| 4,223,125 | 9/1980 | Bier et al. | 528/305 |
| 4,294,719 | 10/1981 | Wagner et al. | 252/182.22 |
| 4,344,855 | 8/1982 | Schäfer et al. | 252/182.21 |
| 4,659,771 | * 4/1987 | Craig | 524/734 |
| 4,774,263 | 9/1988 | Weber et al. | 521/51 |
| 4,835,212 | 5/1989 | Degen et al. | 524/734 |
| 4,855,343 | 8/1989 | Degen et al. | 524/47 |
| 4,931,510 | 6/1990 | Sackmann et al. | 525/302 |
| 5,013,794 | 5/1991 | Sackmann et al. | 525/203 |
| 5,258,466 | * 11/1993 | Sackmann et al. | 525/282 |
| 5,288,787 | * 2/1994 | Sackmann et al. | 524/457 |
| 5,667,848 | * 9/1997 | Wuestefeld et al. | 524/734 |

FOREIGN PATENT DOCUMENTS

| | | |
|---|---|---|
| 3344470 | 6/1985 | (DE) . |
| 029 970 | 6/1981 | (EP) . |
| 400 410 | 4/1995 | (EP) . |
| 1 466 064 | 3/1977 | (GB) . |
| 58-115196 | 7/1983 | (JP) . |

OTHER PUBLICATIONS

Translation of EP 0 400 410 A, PTO–2000–2051 (USPTO, Washington DC) pp. 1–31, Mar. 2000.*

Hawley's Condensed Chemical Dictionary, Eleventh Edition (Van Nostrand Reinhold Co., NY, NY, copyright 1987) p. 300, Oct. 1989.*

DWPI on WEST, week 199049, London: Derwent Publications Ltd., AN 1990–362971, Class A14, EP 0 400 410 A (BAYER AG), abstract, 1990.*

Journal of Organic Chem., 28, Aug. 1963 pp. 2069–2075, T.W. Campbell & K. C. Smeltz, Carbodiimides IV — High Polymers Containing the Carbodimide Repeat Unit.

Kunststoffhandbuch (Plastic Handbook), vol. 7, Poly urethanes, Dr. Günter Artel (Carl Hanser–Verlag, Munich Vienna) month unavailable (1983) pp. 42–61–Dr. K. Schauerte et al, Rohstoffe.

* cited by examiner

Primary Examiner—Daniel S. Metzmaier
(74) Attorney, Agent, or Firm—Joseph C. Gil; Richard E. L. Henderson

(57) ABSTRACT

This invention relates to novel aqueous emulsion polymers obtained by free-radical initiated addition polymerization of at least one monomer in the presence of degraded starch and at least one polymeric emulsifier from the series of sulfo-containing maleic anhydride copolymers and/or sulfo-containing oligourethanes with a branched molecular structure. The invention further relates the use of such emulsion polymers as surface sizing agents for paper and paperlike materials.

8 Claims, No Drawings

SIZING AGENTS FOR PAPER

BACKGROUND OF THE INVENTION

The present invention relates to aqueous emulsion polymers, to their use as surface sizing agents, and to processes for preparing the emulsion polymers.

The prior art has disclosed sizing agents based on aqueous emulsion polymers, but these are not satisfactory with respect to all of the requirements made of them.

Japanese Patent Application 58/115196 describes the use of aqueous dispersions of graft copolymers of acrylates and styrene on starch as sizing agents for paper, and European Patent Applications 257,412 and 276,770 claim graft copolymers of acrylates and acrylonitrile on starch which are likewise employed in the form of fine aqueous dispersions for sizing paper.

European Patent Application 276,770 also describes how, by adding from 0 to 3.0% by weight, based on the sum of the monomers employed, of low molecular mass emulsifiers such as sodium alkyl-sulfonate, sodium lauryl sulfate, or sodium dodecylbenzenesulfonate, it is possible to stabilize the emulsions claimed therein. However, a disadvantage is said to be that adding such an emulsifier impairs sizing and that the sizing agents are often associated with severe foaming.

Alternatively, European Patent Applications 331,066 and 400,410 disclose fine dispersions of sizing agents that have excellent performance properties and are obtained by emulsion polymerization of monomers such as acrylonitrile, butyl acrylate, or styrene, in the presence of polymeric anionic emulsifiers containing sulfonic acid groups (in the case of European Patent Application 331,066, based on maleic anhydride copolymers, and in the case of European Patent Application 400,410 based on polyurethanes with stellate branching). Sizing agent dispersions of this kind exhibit excellent performance properties, especially on neutral and chalk-containing papers. However, such dispersions have low stability to divalent and trivalent cations, such as $Ca^{2+}$ or $Al^{3+}$. Under adverse conditions, this may sometimes result in precipitation on the sizing press and thus to a deterioration in their sizing effect.

It has surprisingly now been found that emulsion polymers based on starch graft copolymers and polymeric emulsifiers are of outstanding suitability as sizing agents that couple improved performance properties with high dispersion stability to divalent cations and an extremely low tendency to foam in use.

SUMMARY OF THE INVENTION

The present invention relates to aqueous emulsion polymers obtained by free-radically initiated addition polymerization of at least one monomer in the presence of (1) degraded starch and (2) at least one polymeric emulsifier selected from the group consisting of (i) sulfo-containing maleic anhydride copolymers and/or terpolymers, (ii) sulfo-containing oligourethanes having a branched molecular structure, and (iii) mixtures thereof.

DETAILED DESCRIPTION OF THE INVENTION

Particularly suitable polymeric emulsifiers from the series of sulfo-containing maleic anhydride copolymers and terpolymers are those of the formula (I)

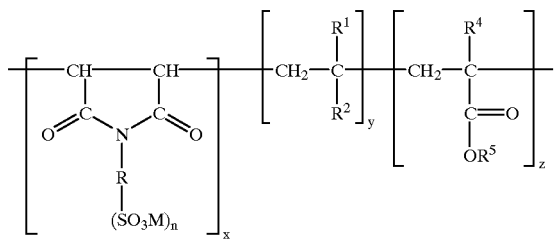

in which
M represents a cation-forming radical (preferably H, Na, K, $NH_4$, or $R^3NH_3$),
n represents 1 or 2,
R represents an aliphatic radical having 1 to 10 carbon atoms or an aromatic radical having 6 to 10 carbon atoms (preferably a radical derived from a $C_1$–$C_4$-alkane or from benzene, methylbenzene or naphthalene, especially —$CH_2CH_2$—),
$R^1$ represents H or $CH_3$,
$R^2$ represents H, $C_1$–$C_6$-alkyl (preferably —$CH_3$, —$C_2H_5$, —$C_4H_9$, —$CH_2$—$C(CH_3)_3$), or phenyl,
$R^3$ represents a hydrocarbon radical of an amine,
$R^4$ represents H or $CH_3$,
$R^5$ represents $CH_3$ or $C_2H_5$, and
x, y, and z are chosen such that the weight-average molecular weight ($M_w^-$) of the polymers of formula (I) is from 5,000 to 500,000 (preferably from 10,000 to 200,000) and the ratio of x:y:z is from 1:1:0 to 1:3:0.5.

The polymers (I) in which the ratio of x:y:z is 1:1:0 are known (cf., e.g., German Patent Application 3,344,470, European Patent Application 331,066) or they can be prepared as described in European Patent Application 331,066.

The polymers (I) in which the ratio of x:y:z is 1:1:0.1 to 1:3:0.5 are novel and are likewise a subject of the present invention. The novel polymers (I) can be prepared in analogy to the known polymers (I).

Particularly suitable polymeric emulsifiers from the series of sulfo-containing oligourethanes having a branched molecular structure are those containing on average per molecule at least 2.2 terminal sulfonic acid groups (sulfo groups).

Suitable oligourethanes have an average molecular weight, calculable from the stoichiometry of the starting material, of less than 30,000 (preferably from 1,500 to 20,000) and have a branched molecular structure. This means that the components used in their preparation include those having a functionality of more than two for the purposes of the isocyanate addition reaction. Suitable oligourethanes, moreover, have terminally incorporated sulfonate groups, at least 2.2 such terminal sulfonate groups being present on average per molecule.

Preferred oligourethanes have a content of terminally incorporated ionic groups of from 7.3 to 400 (particularly from 11 to 300) milliequivalents per 100 g.

The oligourethanes are prepared by the known methods of polyurethane chemistry. Starting materials for their preparation are (a) organic polyisocyanates, preferably of the molecular weight range from 168 to 1,000;

(b) organic compounds having isocyanate-reactive groups and a molecular weight ranging from 60 to 10,000 (preferably from 62 to 3,000), and (c) structural components having at least one isocyanate-reactive group and sulfonic acid groups as well as salts thereof.

Examples of suitable polyisocyanates (a) are 4,4'-diisocyanato-diphenylmethane, 2,4- and/or 2,6-diisocyanatotoluene, 4,4'-diisocyanato-dicyclohexylmethane, 1-isocyanato-3,3,5-trimethyl-5-isocyanatomethyl-cyclohexane (IPDI), 1,6-diisocyanatohexane (HDI), polyisocyanates containing isocyanurate groups, such as the polyisocyanate consisting essentially of N,N',N"-tris-(6-isocyanatohexyl) isocyanurate alone or together with its higher homologues and obtainable by trimerization of some of the isocyanate groups of HDI, polyisocyanates containing urethane groups, such as the reaction product of 1 mol of trimethylol-propane with 3 mol of IPDI or with 3 mol of 2,4-diisocyanatotoluene, and biuret polyisbcyanates, such as the biuret polyisocyanate based on HDI and consisting essentially of N,N',N"-tris-(6-isocyanatohexyl)biuret and its higher homologues. Any desired mixtures of such polyisocyanates can likewise be used as component (a) in preparing the oligourethanes. Moreover, the structural components (a) include, for example, (a1) polyisocyanates containing acylurea groups of the general formula

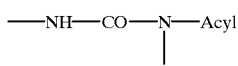

The structural components (a1) are prepared in analogy to the teaching of German Patent Application 2,436,741 by partial carbodiimidization of the isocyanate groups of organic polyisocyanates and addition of organic carboxylic acids onto the resulting carbodiimide-modified polyisocyanates. Typical examples of suitable structural components (a1) are diisocyanates of the general formula

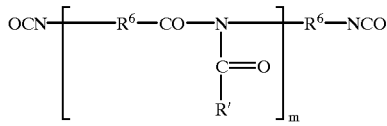

which are prepared by reacting, in a first stage, all or some of the carbodiimide groups of diisocyanatocarbodiimides of the general formula

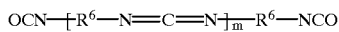

with carboxylic acids of the general formula

alone or in the presence of an appropriate solvent at temperatures from 25 to 100° C.

In these formulas,

R' represents an organic radical (preferably a saturated or unsaturated aliphatic hydrocarbon radical having 1 to 35 carbon atoms, an aryl radical having 6 to 10 carbon atoms, or an araliphatic radical having 7 to 10 carbon atoms), it being possible for different radicals R' to be present alongside one another when two or more radicals R' exist in the same molecule, $R^6$ represents a divalent hydrocarbon radical with or without urethane, ester, and/or ether groups, as can be obtained by removing the terminal isocyanate groups from a simple organic diisocyanate or from a NCO prepolymer containing urethane groups and optionally ether groups or ester groups, it being possible for different radicals $R^6$ corresponding to this definition to be present simultaneously when two or more radicals $R^6$ exist in the same molecule, and m represents an integral or (on average) fractional number from 1 to 10 (preferably from 1 to 4).

The preparation of the diisocyanatocarbodiimides is known and is described, for example, in U.S. Pat. Nos. 2,840,589 and 2,941,966 and by P. W. Campbell and K. C. Schmeltz in *Journal of Organic Chemistry*, 28, 2069 (1963). Diisocyanatocarbodiimides can also be prepared in a particularly gentle and by-product-free manner using a heterogeneous catalysis in accordance with German Patent Applications 2,504,400 and 2,552,350. The carbodiimidization of diisocyanates in the presence of very small amounts of phospholine oxide with subsequent blocking of the catalyst with acid chlorides is described in German Patent Application 2,653,120.

As structural component for the diisocyanates containing carbodiimide groups it is preferred to employ aromatic diisocyanates of the type specified by way of example above under (a1).

Examples of suitable carboxylic acids of the formula R'—COOH are acetic, propionic, hexanecarboxylic, lauric, palmitic, stearic, benzoic, phenylacetic, acrylic, methacrylic, crotonic, 10-undecenoic, oleic, or linoleic acid. In principle it is also possible to employ other monocarboxylic acids that do not correspond to the above definition of R, such as chloroacetic, cyclohexanecarboxylic, abietic, or 4-dimethyl-aminobenzoic acid or monoesters or monoamides of dicarboxylic acids such as oxalic, malonic, succinic, maleic, fumaric, or phthalic acid with monofunctional alcohols or amines. In principle, it is also possible to employ any desired mixtures of the exemplified acids of the general formula R'—COOH. The amount of the acids employed is such that from 0.2 to 1.2 mol (preferably from 0.5 to 1.2 mol) of carboxyl groups are used in the reaction mixture per mol of carbodiimide groups.

Suitable compounds (b) having isocyanate-reactive groups are preferably compounds that contain no hydrophilic or potentially hydrophilic groups of the above-mentioned type and that carry at least one (preferably from 2 to 8 and more preferably from 2 to 4) isocyanate-reactive groups. Examples of such compounds are (b1) polyester or polyether polyols that are known from polyurethane chemistry, which preferably have a molecular weight, calculable from the functionality and the hydroxyl group content, of from 400 to 3,000, which are described, for example, in Kunststoffhandbuch, [Plastics Handbook], Volume 7, Polyurethanes, edited by Dr. Günther Oertel (Carl Hanser-Verlag Munich, Vienna, 1983) at pages 42 to 61, and which can if desired be employed in the form in which they have been "preextended" by reaction with substoichio-metric amounts of a diisocyanate of the type exemplified under (a);

(b2) polyhydric alcohols that preferably have a molecular weight of from 62 to 400 and contain from 2 to 3 hydroxyl groups per molecule, examples being ethylene glycol, propylene glycol, 1,4-butanediol, 1,6-hexanediol, trimethylolpropane, glycerol, or a reaction product of sodium hydrogen sulfite and tetrapropoxylated 2-butene-1,4-diol having the formula

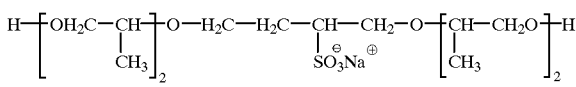

or mixtures of such chain extenders and crosslinkers;

(b3) organic polyamines of the molecular weight range from 60 to 4,000, such as ethylenediamine, hexamethylenediamine, isophorone-diamine, or "amino polyethers" in the molecular weight range from 400 to 4,000, such as are employed as a starting component in European Patent Application 81,701 in connection with the preparation of polyurethane polymers.

Component (b) preferably consists of at least one polyester or polyether polyol of the type exemplified under (b1), alone or in a blend with at least one low molecular mass polyhydric alcohol of the type exemplified under (b2).

Examples of suitable structural components (c) are any desired compounds having at least one isocyanate-reactive group and at least one sulfonic acid group. Preferred structural components of this type include 2-aminoethanesulfonic, 3-aminopropanesulfonic, N-(2-aminoethyl)aminoethanesulfonic (AAS, or $H_2N-CH_2-CH_2-NH-CH_2-CH_2-SO_3H$), 2-aminobenzenesulfonic, 3-aminobenzenesulfonic, 4-aminobenzenesulfonic, 4-amino-1,3-benzenedisulfonic, 5-amino-1,3-benzenedisulfonic, and 2-amino-1,4-benzenedisulfonic acids.

Instead of the exemplified acids, it is also possible to employ their salts with inorganic and organic bases insofar as they are compatible with the other starting materials. As already stated above, structural component (c) consists entirely or predominantly of compounds having only one isocyanate-reactive group.

The oligourethanes to be employed in accordance with the invention can be prepared, for example, by first preparing an NCO-containing prepolymer from the polyisocyanate component (a) and component (b) at a ratio of equivalents of isocyanate groups to isocyanate-reactive groups of from 1.5:1 to 30:1 (preferably from 2:1 to 20:1) and subsequently reacting this prepolymer with the monofunctional structural components (c), generally at a ratio of equivalents of isocyanate groups of the prepolymers to the isocyanate-reactive groups of the monofunctional structural components of approximately from 0.9:1 to 1.1:1 (preferably from 0.96:1 to 1.04:1). The conversion of any potentially ionic groups present to ionic groups can take place, for example, following the completion of the isocyanate addition reactions. Alternatively, the structural components (c) can be used in the form of their alkali metal salts, amine salts, or ammonium salts for reaction with the prepolymers.

The formation of the salts can be accomplished by adding alkali metal hydroxides such as NaOH or KOH, aqueous ammonia solution, aliphatic amines such as trimethylamine or triethylamine, and amino-alcohols such as ethanolamine, diethanolamine, or dimethylethanolamine.

As already stated above, the nature and proportions of the starting components are chosen so as to give oligourethanes of the above-mentioned molecular weight range and a branched molecular structure. By a "branched molecular structure" in this context is meant the presence of at least 0.2 (preferably at least 1.0) branching sites per molecule on average. This degree of branching can be ensured, for example, by including an appropriate amount of at least trifunctional structural components when preparing the oligourethanes.

Since, as stated, it is possible to employ the polyisocyanate component in a considerable excess when preparing the oligourethanes, the oligourethanes frequently constitute mixtures of (i) reaction products of the monofunctional structural components, especially the monofunctional structural components (c), with NCO prepolymers of the structural components (a) and (b), and (ii) reaction products of the monofunctional structural components, especially the monofunctional structural components (c), with polyisocyanates (a) that have not been consumed by reaction with starting components (b). The term "oligourethanes" is intended to embrace such mixtures as well.

The information given regarding the molecular weight of the oligourethanes relates accordingly, in the case of these mixtures, to the number average molecular weight of the individual components present in such mixtures. When referring to the degree of branching and to the number of hydrophilic groups incorporated terminally into the oligourethanes, the numbers are averages. Thus, for example, a reaction product of 1 mol triisocyanate (a) with 3 mol of a mono-functional structural component (c) has 3 terminal hydrophilic centers, one branching side, and 3 terminal hydrophilic centers. The reaction product of (i) 4 mol of monofunctional structural component (c) with (ii) 1 mol of a (tetrafunctional) prepolymer of 2 mol of triisocyanate and 1 mol of diol (b), in turn, has on average 2 branching sides per molecule and 4 terminal hydrophilic centers. An equimolar mixture of these two components would have, accordingly, 1.5 branching sites per molecule and 3.5 terminal hydrophilic centers, on average.

The above-mentioned isocyanate addition reactions are generally conducted within the temperature range from 20 to 180° C. (preferably from 50 to 100° C.), the operation being carried out without solvent or in the presence of an appropriate solvent such as acetone. A particularly suitable procedure is one in accordance with which the NCO prepolymers of components (a) and (b) are prepared without solvent in the melt and then dissolved in acetone and are reacted with the monofunctional structural components. Subsequently, if appropriate, the potential ionic groups are then converted into ionic groups by adding, for example, an appropriate neutralizing agent to the acetone solution and converting the acetone solution into an aqueous solution or dispersion by adding water and distilling off the acetone.

It is of course also possible to use other solvents, examples being N,N-dimethylformamide, N,N-diethylformamide, methyl ethyl ketone, N-methylpyrrolidone, toluene, ethyl acetate, or mixtures of such solvents. It is also possible to dispense with removal of the auxiliary solvents if the presence of such solvents in the ultimate products of the invention is not perceived as a nuisance.

In the preparation of the emulsion polymers of the invention, the oligourethanes act as emulsifiers and also, if appropriate, as a graft substrate. They are generally employed in the form of from 5 to 70% strength by weight (preferably from 20 to 50% strength by weight) aqueous, possibly colloidal solutions or dispersions.

Due to their specific structure, in a manner similar to that of low molecular mass emulsifiers, the oligourethanes exhibit a so-called critical micelle concentration and are thus are capable of forming micelle structures in aqueous phases. The critical micelle concentrations, which can be determined by means of surface tension measurements or conductometric measurements, are generally above 0.5 g (preferably above 1.0 g) of oligourethane per liter of solution or dispersion. The concentrations thus represent the lower limiting value with respect to the concentration of the oligourethane dispersions or solutions employed in processes according to the invention.

For preparing the emulsion polymers of the invention it is preferred to employ
(A) from 5 to 95% by weight of at least one monomer that is an acrylonitrile, methacrylonitrile, vinyl carboxylate, or unsaturated copolymerizable aliphatic or aromatic hydrocarbon, and
(B) from 5 to 95% by weight of acrylic and/or methacrylic esters.

Particularly suitable free-radically polymerizable monomers are styrene, (meth)acrylic esters, and/or (meth) acrylonitrile and mixtures of these monomers. Examples which may be mentioned are styrene, α-methylstyrene, acrylonitrile, methacrylonitrile, vinyl acetate, ethyl acrylate, methyl methacrylate, n-butyl acrylate, i-butyl acrylate, t-butyl acrylate, 2-ethylhexyl acrylate, and hydroxypropyl methacrylate. Particular preference is given to the use of n-butyl acrylate and/or t-butyl acrylate, styrene, and acrylonitrile. Very particular preference is given to employing a mixture that contains from 20 to 80% by weight (particularly from 30 to 70% by weight) of at least one butyl acrylate (preferably n-butyl acrylate and/or t-butyl acrylate) and from 80 to 20% by weight (particularly from 70 to 30% by weight) of styrene and/or acrylonitrile.

Suitable starches are natural starches such as potato, wheat, maize, rice, or tapioca starch, potato starch being preferred. It is preferred to use starch types having an amylopectin content of 80% or more. Particular preference is given to potato starch with an amylopectin content greater than 95%.

It is likewise possible to employ chemically modified starches, such as hydroxyethyl or hydroxypropyl starches, or starches containing anionic groups, such as phosphate starch, or cationic starches containing quaternary ammonium groups.

These starch types are subjected to oxidative, thermal, acidic, or enzymatic degradations. Oxidative degradation of the starch is preferred. Oxidizing agents suitable for degradation are those, such as hypochlorite, peroxodisulfate, hydrogen peroxide, or combinations thereof, which are preferably employed in succession in order to establish the desired molecular weight of the starch. Particular preference is given to starch degradation with hypochlorite, such as commonly carried out to improve the dissolution properties of the starch, and to a further degradation with, for example, hydrogen peroxide.

The degraded starches preferably have a number average molecular weight $M_n$ of from 500 to 10,000, which on the one hand ensures good dispersion of the emulsion polymers and on the other hand prevents premature crosslinking and precipitation of the polymerization batch.

The polymerization is generally conducted such that from 1 to 20% by weight, based on the starch, of a sulfo-containing polymeric anionic emulsifier based on maleic anhydride copolymers and/or on branched oligourethanes is added to the aqueous solution of the degraded starch. These polymeric emulsifiers are already known from the European Patent Applications 331,066 and 400,410, which also describe their preparation in detail in a number of examples. To this mixture of degraded starch and anionic polymeric emulsifier is added the monomer mixture comprising the monomers (A) and (B) and the free-radical initiator. Suitable free-radical initiators are water-soluble initiators, examples being persulfates such as sodium, potassium, or ammonium peroxodisulfate; hydrogen peroxide; or redox systems, which constitute a combination of water-soluble initiators and reducing components such as sodium formaldehyde-sulfoxylate, sodium disulfide, sodium dithionite, or iron(II) sulfate. In order to achieve a high grafting yield and to obtain particularly fine dispersions, the redox system composed of hydrogen peroxide and iron(II) sulfate is particularly preferred.

It is possible to use organic peroxides of low solubility in water, such as t-butyl hydroperoxide or acetyl cyclohexyl sulfonyl peroxide, although these peroxides give only coarse dispersions with a low grafting yield and are therefore less suitable for use on their own.

Surprisingly, however, a particularly suitable combination is a mixture of a water-soluble redox system such as hydrogen peroxide and iron(II) sulfate with an organic peroxide of low solubility, such as t-butyl-hydroperoxide, which are employed in succession. In this method, polymerization is first carried out with hydrogen peroxide and iron(II) sulfate with a high grafting yield to a conversion of about 95% and then t-butyl hydroperoxide is added for subsequent activation, it being possible to achieve a conversion of greater than 99% and a residual monomer content of less than 100 ppm and to dispense with demonomerization. In conventional polymerization techniques without subsequent activation the residual monomer content is so high that subsequent demonomerization, for example, by steam distillation, is necessary in order to keep the residual monomer content below required limit values and to avoid undesirable odor in use. The combination of a water-soluble redox system such as hydrogen peroxide and iron(II) sulfate and an organic peroxide of low solubility in water such as t-butyl hydroperoxide is, therefore, particularly preferred. Low solubility in water as used in this context is intended to indicate that less than 1% of the organic peroxide is completely soluble in water at room temperature.

The polymerization can be carried out either by the feed technique or by a batch technique at temperatures between 20 and 100° C. (preferably between 60 and 90° C.). The reaction times lie between 0.5 and 10 hours (preferably between 1 and 4 hours). The polymerization is conducted at a pH of from 2.5 to 9 (preferably from 3 to 6). The pH can be adjusted within this range using customary acids, such as hydrochloric, sulfuric, or acetic acid, or using bases, such as sodium hydroxide solution, potassium hydroxide solution, ammonia, or ammonium carbonate. The adjustment of pH can also take place, for example, following the polymerization, using sodium hydroxide solution or ammonia, for example.

The concentrations of the finished emulsion polymers are between 10 and 40% by weight (preferably between 15 and 30% by weight).

The amount of polymeric emulsifier added in the preparation of the emulsion polymers of the invention lies between 1 and 20% by weight (preferably between 2 and 15% by weight, particularly between 3 and 10% by weight), based on the amount of oxidatively degraded starch employed.

The aqueous emulsion polymers of the invention are outstandingly suitable as sizing agents for paper and paper-like materials. A further subject of the present invention is the use of the emulsion polymers of the invention as sizing agents for paper and paperlike materials.

The addition of anionic polymeric emulsifier produces fine aqueous dispersions having solids contents of between 10 and 40% by weight and significantly improved performance properties in comparison to dispersions containing only degraded starch as the graft base. The particle sizes of these emulsions are between 20 and 200 nm, particular preference being given to products having particle sizes of between 30 and 150 nm.

The emulsions formed by the process of the invention contain not only homopolymers and/or copolymers of the monomers or monomer mixtures employed for the polymerization but also fractions of graft products of the monomers that have been grafted onto the degraded starch and the polymeric emulsifiers as graft substrates.

The emulsion polymers of the invention are surface sizing agents having a weakly anionic character and little tendency towards foaming and possess a broad spectrum for application. These emulsion polymers are suitable for the surface sizing of all grades of paper produced in the art, such as alum-containing, alum-free, raw papers filled with kaolin or chalk and containing groundwood or waste paper, which may have been produced alternatively in acidic or else neutral or alkaline form and may have been unsized in the pulp or may else have been presized with, for example, alkylketene dimer or alkenylsuccinic anhydride.

The emulsion polymers of the invention can be processed by all processes employed in surface sizing and can be applied in the sizing press liquor to the surface of paper. It is customary to use, for example, a from 5 to 20% strength aqueous solution together with starch and, if desired, pigments and optical brightener in the sizing press or in modern applicator units such as a film press, speed sizer, or gate roll.

The sizing press liquors may additionally comprise finely divided pigments to improve printability, such as chalk, precipitated calcium carbonate, kaolin, titanium dioxide, barium sulfate, or gypsum. For use on graphics papers it is also customary to add optical brighteners, and, optionally, carriers such as polyethylene glycol, polyvinyl alcohol, or polyvinylpyrrolidone. A particular advantage is the high compatibility of the emulsion polymers of the invention with optical brighteners, thereby enabling papers of high whiteness to be obtained.

It is also particularly advantageous that the emulsion polymers of the invention are insensitive to the addition of electrolytes such as Na, Ca, or Al ions, which in many cases may be present in the sizing press liquor or may even be added deliberately to increase the conductivity. In many cases the addition of calcium chloride, for example, to the sizing press liquor leads in fact to an increase in the efficacy of the dispersions of the invention.

The sizing agent emulsions of the invention are particularly suitable for the production of graphics papers that are used for all customary modern printing techniques. In the case of inkjet printing, for example, the requirements are high ink adsorptivity and rapid drying without strikethrough, coupled with good ink holdout, retention of high color density, high resolution, and good smearproofing and waterproofing. In color printing high definition is required; the individual color inks must not run into one another and should possess high color strength, brilliance, and light fastness. These requirements can be met outstandingly by the emulsions of the invention.

For the use of the papers treated with the emulsions of the invention in electrophotographic printing processes, such as in laser printers and copiers, a simultaneous requirement is for good toner adhesion. In other words, the toner must adhere to the paper in a highly smearproof fashion. This requirement can be met outstandingly by the use of the emulsions of the invention on papers presized, for example, with alkyldiketene.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Preparing Polymeric Emulsifier A

A 6 liter steel autoclave was charged with a mixture of 546 g of an alternating maleic anhydride-diisobutylene copolymer having a weight-average molecular weight of about 11,000 g/mol, 1,506 g of a 25% strength aqueous solution of Na taurinate, and 2342 g of electrolyte-free water. After flushing 3 times with nitrogen, the autoclave was closed and heated at 100° C. for 10 hours with stirring. The temperature was subsequently raised to 140° C. and stirring was continued for an additional 10 hours. After cooling to room temperature, a clear aqueous solution of polymeric emulsifier A, having a solids content of 20%, was obtained.

Preparing Polymeric Emulsifier B 600 g of a terpolymer having the composition 68% by weight styrene, 25% by weight maleic anhydride, and 7% by weight methyl methacrylate, together with 900 g of a 25% strength aqueous solution of Na taurinate and 3656 g of deionized water, were heated to 100° C. with stirring in a 6 liter stainless steel autoclave. After stirring at 100° C. for 10 hours, the temperature was raised to 140° C. and stirring was continued for an additional 10 hours. After cooling to room temperature, a 16% strength aqueous solution of polymeric emulsifier B was obtained.

Preparing Polymeric Emulsifier C Based on Oligourethanes 170 g of a polyester made from adipic acid, neopentyl glycol, and 1,6-hexanediol (molar ratio 4:7) and having a hydroxyl number of 65.9 were mixed with 160 g of a polyisocyanate formed by trimerizing the NCO groups of hexamethylene diisocyanate and having an NCO content of 21%. The mixture was heated to 90–100° C. and stirring was continued until the NCO content reached the theoretical level of 7.6% or slightly lower. The resulting prepolymer was then diluted with 330 g of acetone and cooled to room temperature.

75 g of aminoethanesulfonic acid were dissolved in 250 g of water, its salt was formed with 50.5 g of triethylamine, and the mixture was subsequently diluted with 125 g of acetone. This mixture was stirred at 40–50° C. until a clear solution formed.

The prepolymer solution was added to this amine solution over a period of one hour at the same temperature and, after subsequent stirring for a period of 15 minutes, the batch was dispersed with 435 g of water. The acetone was subsequently removed by distillation to give an aqueous dispersion having a solids content of approximately 40%.

Preparing Polymeric Emulsifier D Based on Oligourethanes 35.8 g of a condensate made from 1 mol of adipic acid and 2 mol of diethylene glycol (OH number: 312.9) were mixed with 160 g of the polyisocyanate specified under the preparation of polymeric emulsifier C and 105.0 g of a monohydroxy-functional polyglycol having an average molecular weight of 350. The mixture was heated to 90–100° C. and stirred until the theoretical NCO content of 3.8% was reached.

The subsequent procedures were carried out as described for polymeric emulsifier C, but instead of 75 g of taurine, in accordance with the residual NCO content, 37.5 g of taurine were converted to salt form with 20.3 g of triethylamine.

Distillative workup gave a 40% aqueous dispersion.

Preparing Sizing Agent I 76.8 g of an oxidized potato starch (Perfectamyl® A 4692) were dissolved by heating to 85° C. with stirring in 600 g deionized water in a 1 liter three-necked flask. After the starch had dissolved, 2.4 g of a 35% strength hydrogen peroxide solution and 26.8 g of a 1% strength aqueous solution of $FeSO_4.7H_2O$ were added and the mixture was stirred at 85° C. for 30 minutes.

Subsequently, 24.45 g of a 20% strength solution of polymeric emulsifier A were added to this solution and at the same time the solutions 1 and 2 were metered in over the course of 90 minutes from two separate feed vessels.
Solution 1
　81.6 g of n-butyl acrylate
　81.6 g of styrene
Solution 2
　3.8 g of hydrogen peroxide solution (35% strength)
　106.7 g of deionized water Following the completion of the metered addition the mixture was stirred at 85° C. for 20 minutes, after which 0.7 g of t-butyl hydroperoxide was added.

After a further 2 hours of stirring at 85° C. the mixture was cooled to room temperature and filtered over a 100 μm filter.
Solids content: 24.0%
Average particle size: 198 nm (determined by laser correlation spectroscopy)
Preparing Sizing Agent II Sizing agent II was prepared in the same way as sizing agent I except that a monomer mixture of 81.6 g of n-butyl acrylate and 81.6 g of acrylonitrile was used as feed 1.
Solids content: 23.7%
Average particle size: 135 nm (determined by laser correlations spectroscopy)
Preparing Sizing Agent III To a solution of 76.8 g of oxidized potato starch (Perfectamyl® A 4692) were added at 85° C. 2.4 g of 35% strength hydrogen peroxide solution and 26.8 g of a 1% strength aqueous solution of $FeSO_4.7H_2O$, and the mixture was stirred at 85° C. for 30 minutes.

Subsequently, 20.5 g of a 16% strength aqueous solution of the polymeric emulsifier B were added and at the same time the solutions 1 and 2 were metered in over the course of 90 minutes from separate feed vessels.
Solution 1
　81.6 g of n-butyl acrylate
　81.6 g of acrylonitrile
Solution 2
　3.8 g of hydrogen peroxide solution (35% strength)
　120.1 g of deionized water After the completion of metering, stirring was continued at 85° C. for 2 hours and subsequent activation was effected with 0.7 g of t-butyl hydroperoxide. After subsequent stirring at 85° C. for 2 hours, the batch was cooled to room temperature. Dilution with water gave a sizing agent dispersion having a solids content of 20.8% and an average particle size of 93 nm (determined by laser correlation spectroscopy).
Preparing Sizing Agent IV 40.0 g of an oxidized potato starch (Perfectamyl A® 4692) in 603 g of deionized water were dissolved with stirring and heating at 85° C. in a 2 liter three-necked flask with reflux condenser. 26.8 g of a 1% strength aqueous solution of $FeSO_4.7H_2O$ and 2.0 g of 35% strength aqueous hydrogen peroxide were added in succession. After 30 minutes, starch degradation had ended and 10 g of a 40% strength dispersion of the polymeric emulsifier D were added. Then, in separate feed streams, at 85° C., the monomers and the initiator were metered in over the course of 90 minutes.

Solution 1
　100 g of acrylonitrile
　100 g n-butyl acrylate
Solution 2
　4.8 g of hydrogen peroxide (35% aqueous)
　127 g of water 20 minutes after the end of the metered addition 0.7 g of tert-butyl hydroperoxide were also added and stirring was continued at 85° C. for 2 hours. Subsequently, the batch was cooled to room temperature and filtered. A stable polymer dispersion having a solids content of 24.4% and an average particle size (laser correlation spectroscopy) of 97 nm was obtained.
Preparing Sizing Agent V (Comparative Example)

The procedure set out for preparing sizing agent IV was repeated except that no polymeric emulsifier was added after starch degradation.

Filtration through a 100 μm cloth gave a stable polymer dispersion having a solids content of 23.8% and an average particle size of 131 nm.

Use Examples

The sizing action of the sizing agents of the invention was tested on chalk-containing paper with a wet absorption of 95% and a basis weight of 80 g/m$^2$.

The paper was sized on a Model HF laboratory sizing press from Mathis, Zurich, Switzerland. The sizing liquor employed was a solution of 5 parts by weight of oxidized potato starch Perfectamyl® A 4692 and 0.375 parts by weight of the test sizing agent, which was made up to 100 parts by weight with water. The surface-sized papers were dried on a drying cylinder at about 100° C. for one minute. Prior to the sizing test, the papers were acclimatized at room temperature for 2 hours.

In order to assess the degree of sizing of the surface-sized papers, Cobb values were measured in accordance with DIN 53122. Cobb values are defined as the water uptake within a wetting time of 60 seconds, reported in g/m$^2$. The lower the Cobb value, the better the degree of sizing.

To determine the salt stability of the sizing agent emulsions of the invention 0.5% of $CaCl_2$ was added to a sizing liquor consisting of 5% Perfectamyl® A 4692 starch and the test sizing agent, and the mixture was heated to 70° C. Visual assessment was used to determine whether sedimentation occurred.

To measure the foaming behaviour, 0.375% by weight of active substance of the test sizing agent was dissolved in a sizing liquor containing 5% by weight of oxidized potato starch (Perfectamyl® A 4692) and the solution was heated to 60° C. 200 ml of this sizing liquor were allowed to free fall from a height of 60 cm from an aluminum vessel in which the underside had a circular opening of 4 mm in diameter (Ford cup) into a graduated glass beaker. The volume in ml of the foam which formed above the surface of the liquid was determined both immediately and after standing in air for 1 minute. The first value gave information on the foaming tendency of the sizing agent and the second value gave information on the rate of foam breakdown and on the stability of the foam.

Table 1 below collates the performance results obtained with the sizing agents I to III:

TABLE 1

| Sizing agent | Cobb value (60") [g/m²] | Ca Stability | Cobb value (60") after addition of 0.5% CaCl₂ | Foam volume in [ml] immediately | Foam volume in [ml] after 1 minute |
|---|---|---|---|---|---|
| I | 23.3 | no sediment | 20.3 | 70 | 30 |
| II | 20.1 | no sediment | 18.1 | 90 | 60 |
| III | 18.9 | no sediment | 18.6 | 100 | 40 |

Table 2 reproduces the Cobb 60 values measured with the sizing agent IV and the comparison product V on chalk-containing paper. In this table it is very evident that the sizing agent IV of the invention produces a substantially better sizing action than the comparative product V.

TABLE 2

| Sizing agent | IV | | | V | | |
|---|---|---|---|---|---|---|
| Amount used (solid, %) | 0.15 | 0.20 | 0.25 | 0.15 | 0.20 | 0.25 |
| Cobb 60 [g/m²] | 22.9 | 21.8 | 19.7 | 28.0 | 23.1 | 21.0 |

The dispersions IV and V were salt-stable at 70° C. with 0.5% CaCl₂ and also retained their sizing action thereafter.

What is claimed is:

1. An aqueous emulsion polymer obtained by free-radically initiated addition polymerization of at least one monomer in the presence of (1) degraded starch and (2) at least one polymeric emulsifier selected from the group consisting of (i) sulfo-containing maleic anhydride copolymers and/or terpolymers, (ii) sulfo-containing oligourethanes having a branched molecular structure, and (iii) mixtures thereof.

2. An aqueous emulsion polymer according to claim 1 wherein the monomer is a mixture of
   (A) from 5 to 95% by weight of at least one acrylonitrile, methacrylonitrile, vinyl carboxylate, or unsaturated copolymerizable aliphatic or aromatic hydrocarbon, and
   (B) from 5 to 95% by weight of one or more acrylic and/or methacrylic esters.

3. An aqueous emulsion polymer according to claim 1 wherein the monomer is a mixture of (A) acrylonitrile and (B) n-butyl acrylate and/or t-butyl acrylate.

4. An aqueous emulsion polymer according to claim 1 wherein the monomer is a mixture of (A) styrene and (B) n-butyl acrylate and/or t-butyl acrylate.

5. An aqueous emulsion polymer according to claim 1 wherein the polymeric emulsifier is a sulfo-containing maleic anhydride copolymer and/or terpolymer having the formula (I)

$$\left[\begin{array}{c}-CH-CH-\\ \phantom{-}O=C\phantom{-}C=O\\ \phantom{-}\diagdown N \diagup\\ R\\ (SO_3M)_n\end{array}\right]_x \left[\begin{array}{c}R^1\\ -CH_2-C-\\ R^2\end{array}\right]_y \left[\begin{array}{c}R^4\\ -CH_2-C-\\ C=O\\ OR^5\end{array}\right]_z \quad (I)$$

wherein

M represents a cation-forming radical, n represents 1 or 2,

R represents an aliphatic radical having 1 to 10 carbon atoms or an aromatic radical having 6 to 10 carbon atoms, $R^1$ represents H or $CH_3$, $R^2$ represents H, $C_1$–$C_6$-alkyl, or phenyl, $R^4$ represents H or $CH_3$, $R^5$ represents $CH_3$ or $C_2H_5$, and x, y, and z are chosen such that the weight-average molecular weight of the polymer of formula (I) is from 5,000 to 500,000, and the ratio of x:y:z is from 1:1:0 to 1:3:0.5.

6. An aqueous emulsion polymer according to claim 1 wherein the polymeric emulsifiers is a sulfo-containing oligourethanes having a branched molecular structure, having on average per molecule at least 2.2 terminal sulfonic acid groups, and having an average molecular weight of less than 30,000 obtained by reacting
   (a) an organic polyisocyanate,
   (b) an organic compound having isocyanate-reactive groups and a molecular weight ranging from 60 to 10,000, and
   (c) a structural component having at least one isocyanate-reactive group and sulfonic acid groups or a salt thereof.

7. An aqueous emulsion polymer according to claim 1 in the form of a colloidally dispersed solution having an average particle size of from 20 to 200 nm.

8. An aqueous emulsion polymer according to claim 1 wherein the degraded starch is oxidatively degraded potato starch.

* * * * *